United States Patent [19]
Meadows

[11] Patent Number: 5,996,892
[45] Date of Patent: Dec. 7, 1999

[54] MEANS AND METHOD OF IDENTIFYING OBJECTS USING A ZERO CONTRAST SENSOR

[75] Inventor: Stephen Wayne Meadows, Blairs, Va.

[73] Assignee: The Goodyear Tire & Rubber Company, Akron, Ohio

[21] Appl. No.: 08/622,777

[22] Filed: Mar. 27, 1996

[51] Int. Cl.[6] .................................................. G06K 7/10
[52] U.S. Cl. .................................. 235/462.01; 235/487
[58] Field of Search .............................. 235/462.01, 487, 235/490; 340/572

[56] References Cited

U.S. PATENT DOCUMENTS

| | | | |
|---|---|---|---|
| 4,002,889 | 1/1977 | Hoyer-Ellefsen | 235/487 |
| 4,020,278 | 4/1977 | Carré et al. | 235/490 |
| 4,165,033 | 8/1979 | Nielsen et al. | 235/490 |
| 4,327,283 | 4/1982 | Heyman et al. | 235/487 |
| 4,625,101 | 11/1986 | Hinks et al. . | |
| 4,656,463 | 4/1987 | Anders et al. | 340/572 |
| 5,233,844 | 8/1993 | Knippscheer et al. | 62/440 |

Primary Examiner—Harold I. Pitts
Attorney, Agent, or Firm—David E Wheeler

[57] ABSTRACT

Siping, of a specific pattern, is used as a code to provide an identification number and/or a part number on a rubber object. The depth and width of the sipes, and the height and width of the rubber bars between the sipes, can be read using a zero contrast reading device, and the specific pattern of sipes and bars can be converted into identifying symbols such as letters and/or numbers. The identity of the object can be matched with a data base which may provide the history of the object.

11 Claims, 2 Drawing Sheets

MEANS AND METHOD OF IDENTIFYING OBJECTS USING A ZERO CONTRAST SENSOR

BACKGROUND OF THE INVENTION

This invention relates to a method and apparatus for tracking the inventory and history of specific individual rubber products.

There is a need to track the history of rubber objects which are durable and have a long but finite useful life. Tires, for example, and for the purpose of illustration more specifically aircraft tires, may be retreaded many times, and there is a need to keep track of the number of times such a tire is retreaded, in addition to the number of landings and take-offs which such tires are subjected to. Letter and number markings placed on the tires can be washed off, scuffed off, or covered with other substances that make them unreadable. The use of bar code labels to replace markings has been attempted, but have been found to be only slightly more useful than letter and number markings.

Hind, in U.S. Pat. No. 4,625,101, has designed a bar code that is cut into the sidewall rubber of a tire wherein each bar of the code has an angle that reflects light in a specific manner. Since these carved bar codes are read by scanning with a light source, and their readability is dependent on the reflectance of light, they have some of the same drawbacks as other kinds of markings and, in addition, are labor intensive to produce.

It is an object of the invention to provide a system to provide and read an identification code and/or part number on a rubber object wherein the reading of the code is not dependent on a light source or the reflectance of light from the rubber object. Further objects of the invention will be apparent from the following description and claims.

SUMMARY OF THE INVENTION

A method for identifying and tracking a rubber object comprises the steps of: (a) placing an insert/inserts into a mold in which a rubber object is to be cured, the insert having blades thereon having specific spacing and frequency unique for the rubber object; (b) filling the mold with uncured rubber; (c) curing the rubber and fixing the spacing and frequency of sipes corresponding to the blades in the surface of the rubber object; and (d) using a zero contrast reading device to read the spacing and frequency of the sipes and converting the data obtained into a binary code specific for the rubber object.

The method may comprise the additional steps of: (a) storing historical information specific to the rubber object, and (b) updating the history and status of the rubber object, if desired, when the unique spacing and frequency of the sipes are read. The history and status may be transferred to a data base in a computer, and the data base updated when the identifying symbols on the rubber object are read.

The spacing and frequency of the sipes may be arranged to provide a serial number identification and/or part number identification for the rubber object. Other information may be coded into the sipes.

In an illustrated embodiment, the method of the invention is used to track a pneumatic tire and the method comprises the further step of molding sipes in a sidewall of the tire. In order to accomplish this, metal inserts are stamped with information for each tire to be cured in a mold, and the inserts are placed in a mold before a tire is cured. The tire is then cured in the mold, and the identifying information is molded into the sidewall of the tire.

At least a portion of the insert can be changed for each tire which is to be molded, so that each tire molded has information unique to that tire.

Also provided is a pneumatic tire comprising at least a pair of parallel annular beads, a carcass ply wrapped around the beads, belts or breakers disposed over the carcass ply in a crown area of the tire, a tread disposed over the belts or breakers, and a sidewall disposed between the tread and the beads, wherein the sidewall has siping wherein sipes in the sidewall are distributed in a pattern unique for the tire, the siping pattern providing identifying means for the tire. The sipes may vary in width and are separated by different width spaces to provide the pattern. The pattern of the sipes can be identified with the serial number and/or part number of the tire.

Also provided is an insert for a tire mold comprising a malleable metallic material having a length and a width and a nominal thickness, the insert having blades wherein the blades have various widths and are variously spaced in a substantially linear pattern, the pattern being associated with an identifying symbol. In a specific embodiment, the insert has a length of 3 to 13 inches, a width of ¼ inch to 2 inches and a thickness of 0.005 to 0.05 inch. The insert may be attached to the mold by screws, fitting, magnets or a mixture thereof.

DETAILED DESCRIPTION OF THE INVENTION

Figure 1:
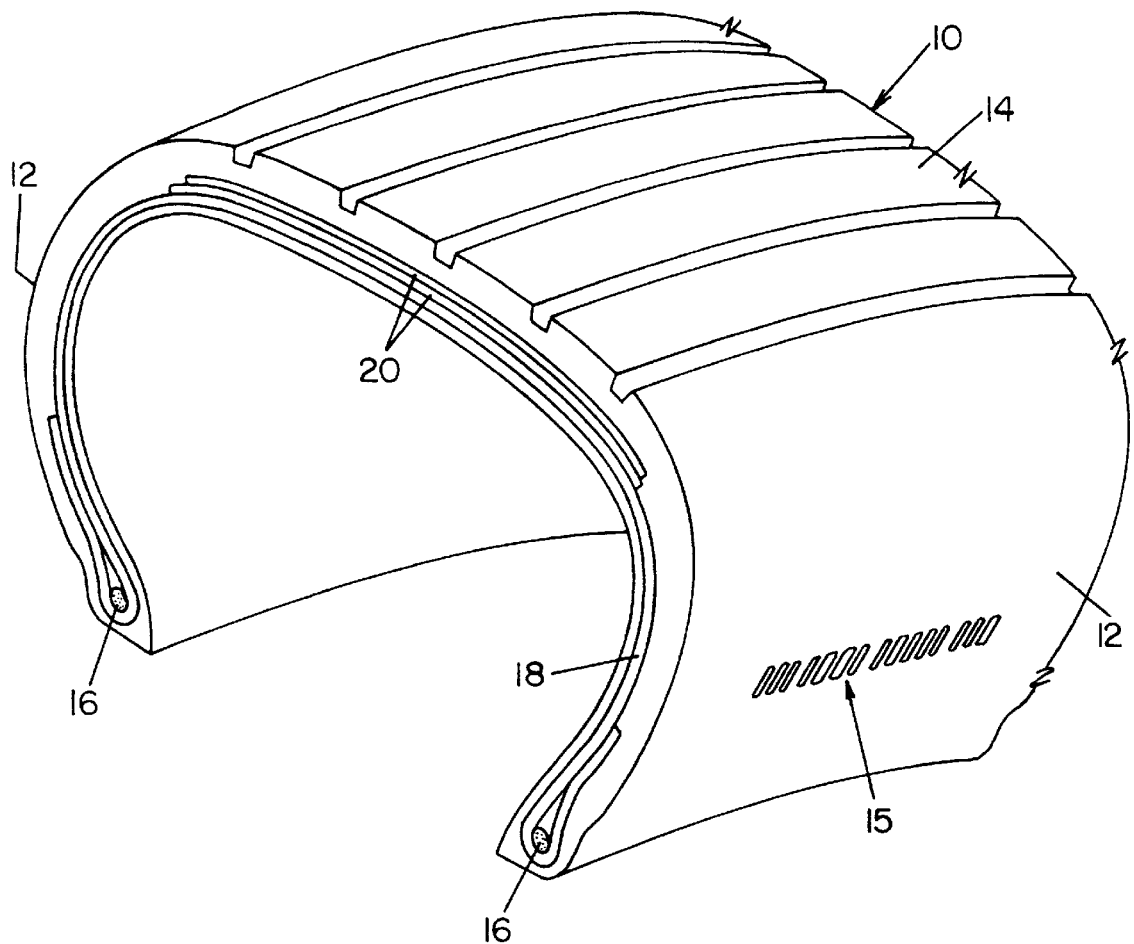
FIG. 1 illustrates a tire of the invention employing a means for identifying said tire.

With reference now to FIG. 1, a pneumatic tire 10 is illustrated having at least a pair of annular beads 16, at least one carcass ply 18 wrapped around the beads 16, a belt/breaker 20 disposed over the crown area of the carcass ply 18, tread 14 disposed over belt or breaker 20, and sidewalls 12 disposed between the tread 14 and the beads 16. In the illustrated embodiment, a code 15 is molded into tire sidewall 12 which provides a means for identifying a specific tire.

Figure 4:
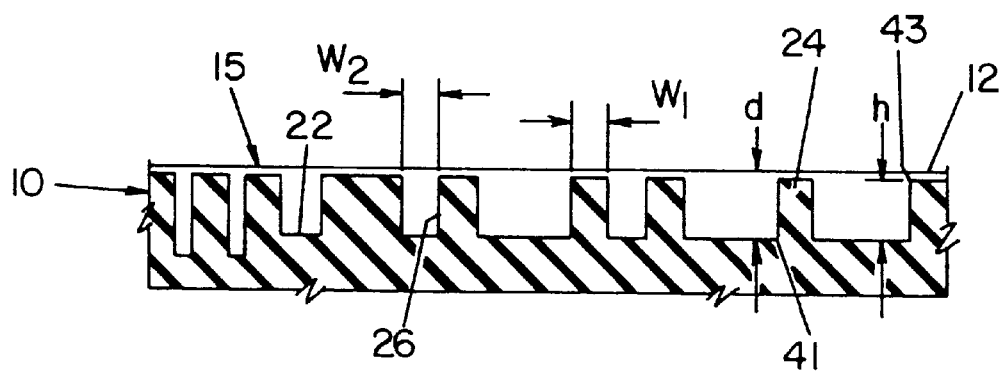
FIG. 4 illustrates a side view of the code molded into the tire sidewall.

The code comprises a specific sequence of molded depressions 22 and bars 24 which have varying depths d and heights h, respectively, and various widths $w_1, w_2$, respectively. See FIG. 4. In the illustrated embodiment, the depressions 22 and bars 24 are made with substantially squared off walls 26, and a sharp distinction is apparent between the height h of the bars and the depth d of the depressions because of corners 41 at the bottom of the depressions and corners 43 at the top of the bars.

Although the bar code is illustrated with sharp corners, those skilled in the art will recognize that a scanner may be used to recognize height differences only, and the bar code can be made with more rounded corners. In the illustrated embodiment, it is believed that it is easier to obtain more clear readings when there is a sharp contrast between depressions 22 and bars 24.

The distinction between the height of the bars and the depth of the depressions, and the distinction between the width of the bars and the width of the depressions can be used to provide a specific signal, and a specific sequence of signals, which can represent a specific sequence of numbers that identify the tire by part number and by sequence number.

In the illustrated embodiment, industry standard bar code sequencing is used that depends only on the width of the bars and spaces and the distances between them. The sensor 46 is used to read a difference in height, and the amount of the difference is not important to the result obtained. The first part of the code relates to an identifying part number, and the second portion of the code relates to a specific identification number unique for a particular rubber object.

Since the code is dependent on physical structure, and not the reflectance of light, the code can be read by a zero contrast, non-light sensor such as a sonic sensor, an ultrasonic sensor, a radar sensor or similar device. Sensors that can be used in the method of the invention are available from Sensis Corporation, 5793 Widewaters Parkway, DeWitt, N.Y., and are sold under the trade names BBC-1000 and BBC-1400.

Figure 2:
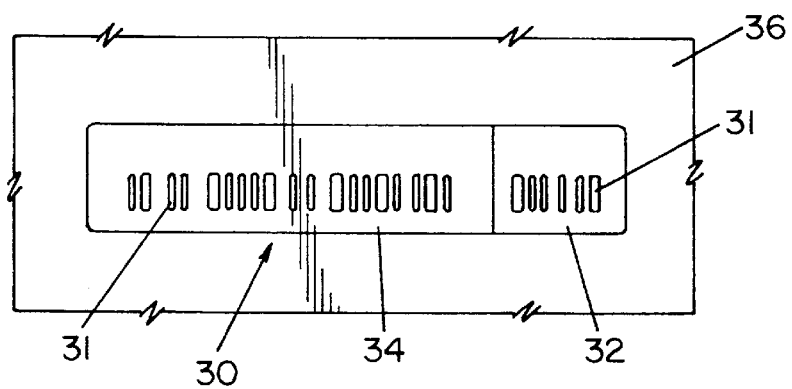
FIG. 2 illustrates a metal insert which is placed in a tire mold to provide a code specific for a specific tire.

Since differences in height are being detected by the sensor, the sensor can be used to read the mold insert, see FIG. 2, and obtain the same numbers/letters that are obtained when the rubber molded by the insert is read on the tire. Also, the same results can be obtained whether the back or the front of the insert is read.

Those skilled in the art will recognize that the code can also be used as an inventory tool for tracking tires as they are manufactured and warehoused.

With reference now to FIG. 2, a metal mold insert 30 can be used to mold the bars and depressions into the sidewall of a tire. Mold insert 30 has blades 31 wherein the blades are provided in a specific pattern representing specific part numbers (pn) and identification numbers (id). One portion of insert 30, e.g. part 34 can be attached to the mold in a somewhat permanent manner using a press fit, screws, or pop rivets, and accordingly, a specific part number can be molded into every tire cured in the mold. A second portion, e.g. part 32 of the insert can be attached to the mold in a temporary manner, such as adhesively or magnetically, so that it can easily be changed each time a tire is placed in a mold, so that a code specific for each tire can be created.

In the illustrated embodiment, the insert 30 is made of an inexpensive, malleable metal. The insert may be made having a length of 3 to 13 inches, preferably 4 to 10 inches, a width of ¼ inch to 2 inches, preferably ½ inch to 1 inch, and a nominal thickness, preferably 0.005 to 0.05 inch.

In the method of the invention, the insert is placed in a mold, preferably in two separate portions, wherein part 34 containing the pn code is attached to the mold using a press fit, screws, or pop rivets, and magnetic part 32 containing the id code is placed in the mold and held in position by an adhesive of or a magnetic force on the insert, and then uncured rubber is placed in the mold. In the illustrated embodiment, the mold is a tire mold, and the insert is placed in the proximity of the sidewall of the tire. When the tire is cured, sipes, corresponding to the blades on the insert are molded into the sidewall to provide a sturdy, substantially permanent sidewall pattern.

Figure 3:
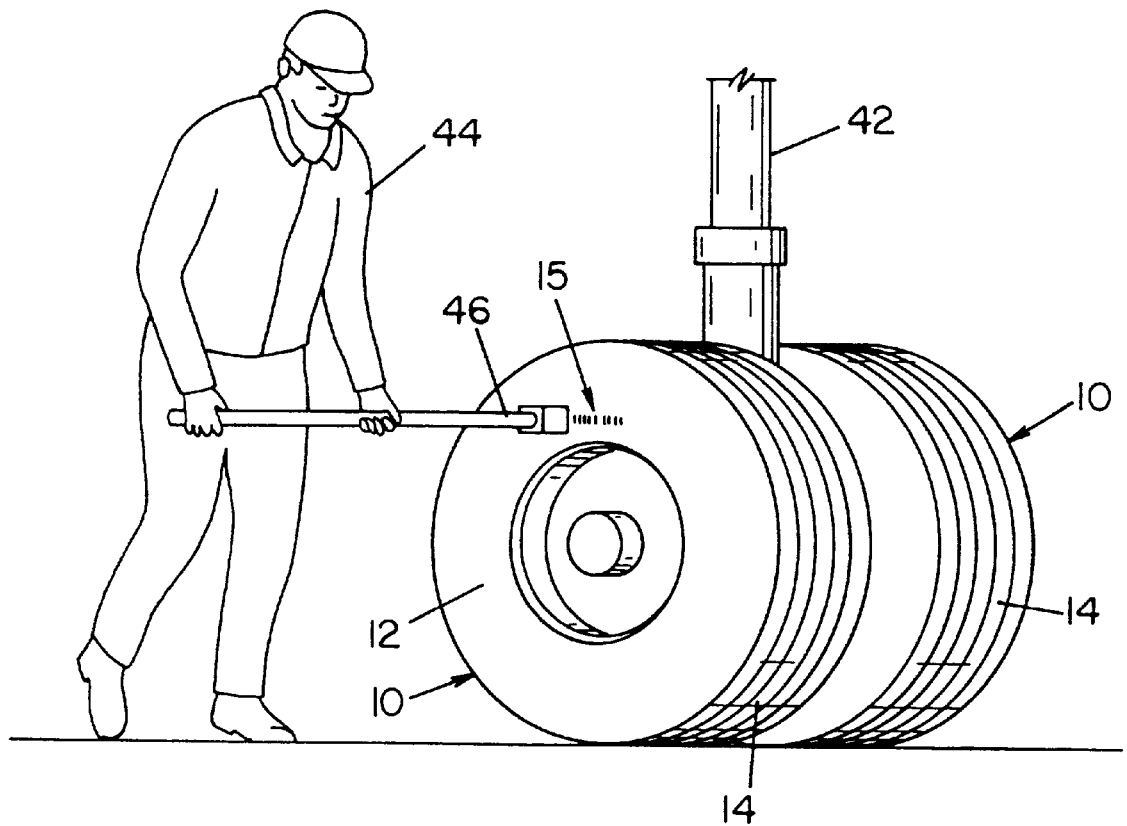
FIG. 3 illustrates the reading of the code for identifying a tire.

With reference now to FIG. 3, in the method of the invention, when it is desired to check the status or condition of a specific tire, a technician 44 uses sensor 46 to read the code 15 to identify the tire 10 mounted on aircraft strut 42. In the illustrated embodiment, when the sensor 46 is activated and brought into the proximity of the code 15, to within ½ to about 6 inches, the sensor converts vibration patterns created by the sensor and reflected off the sidewall of the tire into a binary code which is translated into symbols such as letters and/or numbers, and may be read visually on an appropriate display, or read into memory for further correlation with data.

In the method, the history of the tire is retained in a data base, which is updated at appropriate points in the history of the tire and/or at specific time intervals. When the identification (id) number and/or part number (pn) of the tire is read, the technician can correlate the id/pn with the data base and determine how many times the tire has been retreaded, how many total take-offs and landings the tire has encountered, how many take-offs and landings encountered since the last retread and the amount of time in service. This information, together with visual inspection of the tire, can be used in a comprehensive preventative maintenance program.

Also, in an extended embodiment of the invention and since the sensor can be used to read mold insert 30 and bar code 15 in the same manner, a sensor attached directly to a data base may be provided in proximity to the tire mold, and the insert may be read each time a tire is molded to place the specific tire being molded into the tire data base. Likewise, as a quality control step, the code 15 can be read on the tire when it is completed to be certain that the code on the tire matches up with the already established data base.

While the invention has been specifically described and illustrated, those skilled in the art will recognize that the invention can be variously modified and practiced. The invention is limited only by the scope of the following claims.

What is claimed is:

1. A method for identifying and tracking a rubber object comprising the steps of:
   (a) placing an insert/inserts into a mold in which a rubber object is to be cured, said insert having blades thereon having specific spacing and frequency unique for said rubber object;
   (b) filling the mold with uncured rubber;
   (c) curing said rubber and fixing the spacing and frequency of sipes corresponding to said blades in the cured surface of the rubber object; and
   (d) using a zero contrast reading device to read the height and width of rubber bars between said sipes to provide information such as a serial number identification and/or part number identification for said rubber object.

2. The method of claim 1 comprising the further steps of:
   (a) storing historical information specific to said rubber object, and
   (b) updating the history and status of said rubber object when the unique spacing and frequency of said sipes are read.

3. The method of claim 2 comprising the further step of transferring said history and status to a data base in a computer.

4. The method of claim 2 comprising the further steps of
   (a) associating a data base containing the history and status of said rubber object with said zero contrast reading device and
   (b) updating said data base when the spacing and frequency of said sipes are read.

5. The method of claim 1 comprising a further step of arranging the spacing and frequency of said sipes to provide a serial number identification and/or part number identification for said rubber object.

6. The method of claim 1 wherein said rubber object is a pneumatic tire and said method comprises the further step of placing said sipes in a sidewall thereof.

7. The method of claim 1 comprising the further steps of:
(a) stamping out metal inserts with information for each tire to be cured in a mold,
(b) placing an insert in a mold before a tire is cured, and
(c) curing said tire in the mold.

8. The method of claim 7 comprising the further steps of changing at least a portion of said insert for each tire to be molded so that each tire molded has information unique to that tire.

9. The method of claim 1 comprising the further steps of
(a) permanently fixing an insert in the mold to provide information common to all items manufactured using the mold, and
(b) temporarily fixing an insert in the mold to provide information unique to a specific item manufactured in the mold.

10. The method of claim 1 comprising the further step of shaping said bar code to have squared off walls to provide corners at the bottom of depressions between the bars and at the top of the bars.

11. The method of claim 1 which comprises the further steps of
(a) reading an insert before it is placed in a mold to create a data base, and
(b) reading the bar code on the tire and comparing said reading with the data base as a means of quality control.

* * * * *